Patented Mar. 14, 1939

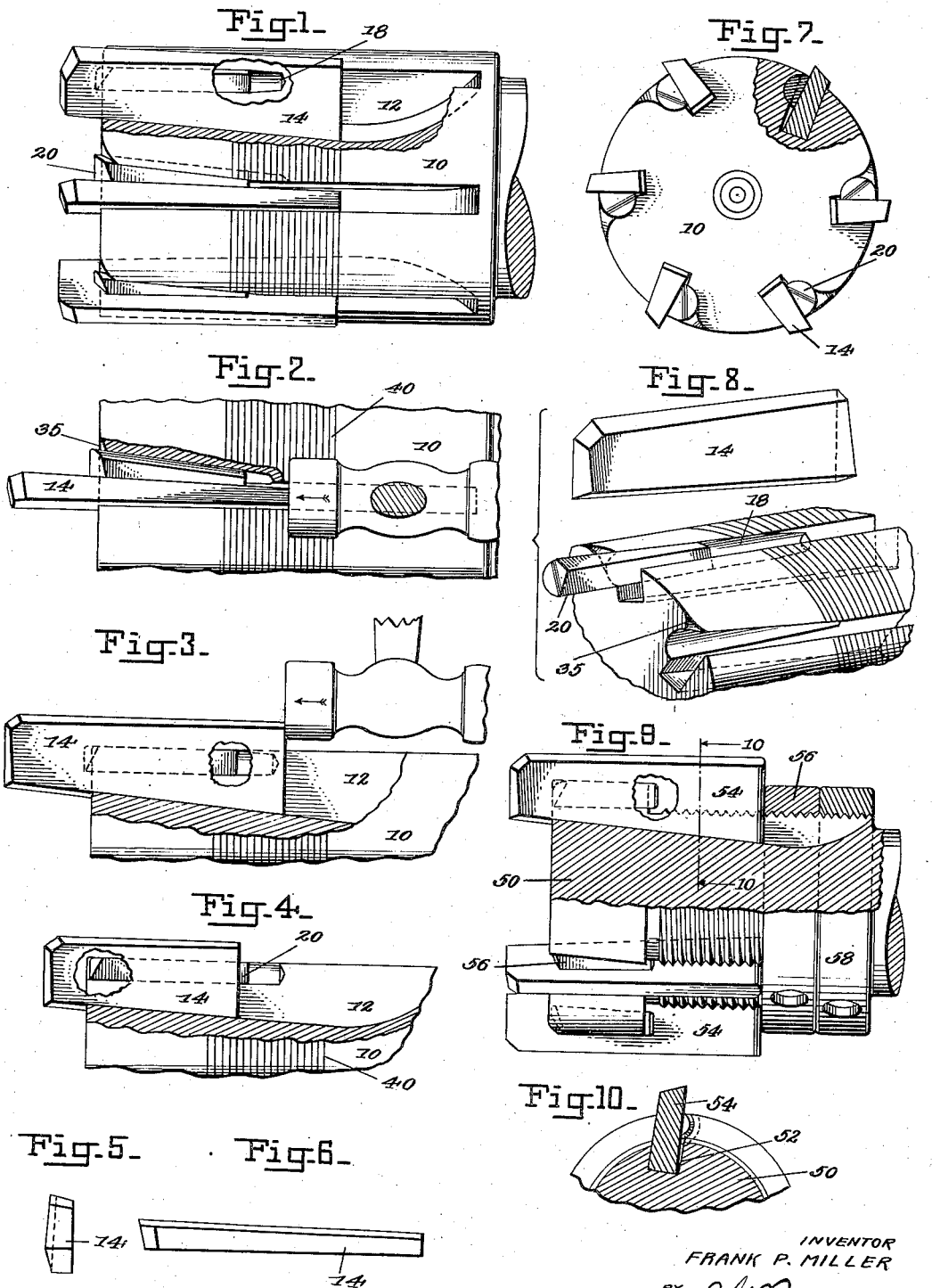

2,150,286

UNITED STATES PATENT OFFICE 2,150,286

INSERTED BLADE CUTTER

Frank P. Miller, Meadville, Pa.

Application April 19, 1934, Serial No. 721,394

1 Claim. (Cl. 29—105)

This invention relates to cutting and boring tools of the type in which inserted blades are employed.

The invention forming the subject of this application looks to an inserted blade cutter in which the blade mounting provides for the expeditious, accurate and secure adjustment of the blade and in which the blade may be quickly released for resetting or other purposes by simply driving forwardly thereon and thus breaking the binding engagement between the blade and the restraining means therefor.

More specifically, the blade mounting embodies a blade receiving slot having longitudinally and radially parallel side walls, while the blade adjustably positioned in the slot is tapered longitudinally and radially to co-act with the associated wedge in securing the blade firmly against the back side wall and bottom of the slot and against shifting under the influence of the cutting thrust and, at the same time, providing for the quick and simple release of the blade for resetting or other purposes.

By way of further brief reference to the release of the blade by driving directly thereon, as distinguished from driving on the fastening wedge therefor, it will be recognized by those conversant with this art, that in those cutters where it is necessary to drive on the wedge to retract the same and thus release the blade, the carrier must be formed with openings or other means by which there may be gained access to the small end of the wedge for striking purposes and this, of course, is to be avoided if possible.

Also, as is important to observe, by having the walls of the slot radially and longitudinally parallel, as distinguished from tapered radially and longitudinally, to correspond to the taper of the blades, the cost of manufacture is decreased.

By way of further brief preliminary reference to the advantages accompanying the particular form of slot, it is pointed out that the radially parallel side walls thereof allow of the insertion of the blades from the periphery of the carrier, as distinguished from the insertion of the blades from one end of the carrier. On many jobs, this is a substantial advantage.

Other attributes of the invention will become apparent during the course of the following description.

In the accompanying drawing, forming a part of this application, and in which like numerals are employed to designate like parts throughout the same, Figure 1 is a fragmentary side elevation of a rotary cutter embodying the invention, Figure 2 is a fragmentary plan view of the cutter, the view illustrating the manner in which the blades of the cutter may be driven forwardly and thus released, Figure 3 is a fragmentary vertical sectional view through the cutter and illustrating the manner in which the blades may be driven forwardly and thus released, Figure 4 is a detail longitudinal sectional view disclosing one of the blades in position after having been several times adjusted and reground, Figure 5 is an end elevation of a blade, the view illustrating the radial taper of the blade, Figure 6 is an edge view of the blade and illustrating the longitudinal taper thereof, Figure 7 is a front end elevation of a rotary cutter embodying the invention, parts being in section, Figure 8 is a fragmentary group perspective of the rotary cutter, Figure 9 is a fragmentary side elevation illustrating a slightly modified form of invention, the view being partly in section, Figure 10 is a detail sectional view taken on line 10—10 of Figure 9.

In the drawing, the numeral 10 designates a carrier or support which may, of course, form the body of a reamer as illustrated or a milling cutter or any one of a number of other cutting tools.

As shown in Figure 1, the body 10 is provided with an annular series of spaced more or less longitudinally extending slots 12 opening out through the periphery and forward end thereof, for the reception of blades 14.

It is further illustrated in Figure 1, that the bottom walls of the slot 12 are inclined outward toward the forward ends thereof at acute angles to the longitudinal axis of the carrier from which it will be seen that, as in the case of numerous other cutters, forward adjustment of the blades compensates for end and radial wear on the blade. That is to say, since the blades 14 are seated upon the bottom walls of the slots, such bottom walls define adjusting angles for the properly proportioned forward and outward adjustment of the blades.

The side walls of the slot 12 are shown in Figure 1 to be longitudinally parallel, while from Figure 7 it will be seen that the side walls are also radially parallel. This form of slot 12 is less expensive to produce than a dove-tail slot, and hence decreases the cost of manufacture.

In addition, the radially parallel side walls allow of the insertion of the blades from the periphery of the carrier, as distinguished from the insertion of the blades from one end of the carrier. In many operations this is a substantial advantage. Thus, by having the side walls of the slot longitudinally and radially parallel, the cost of forming such slots is decreased and at the same time this arrangement of the side walls of the slot with respect to each other, looks to the expeditious insertion of the blade from the periphery of the carrier. It is believed that I am the first to appreciate this dual advantage and to employ an inserted blade cutter in which the slots in the carrier have radially and longitudinally parallel side walls while the blades that are located in said slots are longitudinally and radially tapered. To be sure, it is notoriously old to have blade receiving slots that have side walls that are longitudinally and radially parallel. By the same token, it is old to employ blades that taper longitudinally and radially. However, I believe I am the first in this art to mount longitudinally and radially tapered blades in slots in which the side walls thereof are longitudinally and radially parallel.

Referring now to Figures 1, 3 and 6 it will be seen that the blades 14 are tapered longitudinally or, as might otherwise be expressed, the side walls of the blades converge toward the rear ends thereof.

On the other hand, it is illustrated in Figures 5 and 7, that the blades are also radially tapered, with the side walls of the blade converging in the direction of the periphery of the carrier and thus cooperating with the longitudinal taper of the blades in producing a compound taper by which the blades are held securely in place and by which the blades may be easily and quickly released for re-setting or other purposes.

The radial taper of the blades is shown to be uniform from the inner to the outer edges of the blades thereby leaving the leading radial edges of the blades unbroken for use in facing relatively wide shoulders on work.

As shown in Figures 1, 2 and 8, one side wall of each slot 12 is formed with a longitudinally extending groove 18 opening out through the forward end of the body 10 and adapted for the reception of a segmental wedge 20. From Figure 8 it is apparent that the wedge 20 is slidably and detachably mounted in the groove 18 and that such wedge projects into the associated slot 12 for pressure contact with the adjacent blade 14. By reason of the compound taper of the blade, and the engagement of such blade by the wedge, the blade is held against shifting under the influence of the cutting thrust thereon. That is to say, the increasing thickness toward the forward end of the blade resists rearward shifting of the blade while the increasing thickness of the blade in the direction of the inner edge thereof inhibits radial displacement of the blade. This dual purpose is important.

It will be observed that the diminishing cross sectional area of the wedge and the groove 18 in the direction of the rear end of the tool provides for the uniform pressure contact of the wedge with the opposed surface of the blade notwithstanding numerous and successive adjustments of the blade. Also, the fact that the wedge is segmental in cross-section with its arcuate surface presented for contact with the correspondingly shaped wall of the groove 18 makes possible the slight axial rocking of the wedge required to adapt the wedge to the blade at all positions thereof.

To secure or lock the several blades in the desired position of adjustment, it is simply necessary to place the blades in the approximate positions the same will occupy when adjusted and then introduce the wedges into the grooves so that such wedges have an initially light pressure contact with the blades. This may be done by mild striking of the wedges on the heads thereof. When the blades have thus been secured lightly in position the operator drives rearward thereon to establish a firm binding contact between the blades and the back walls of the slots and between the blades and the wedges.

It will be seen that the wedging action is in the direction general of the cutting thrust on the tool with the result that these two factors act in concert in securing the blades against shifting. That is to say, the blades are increased in wall thickness both radially and longitudinally in the direction of the forward ends thereof so that the cutting thrust merely tends to drive the thick ends of the blades rearward against the contrary influence of the wedges and thus tighten the grip on the blades.

However, when it is desired to release the blade for resetting or other purposes it is merely necessary to drive forwardly thereon, this being illustrated in Figures 2 and 3. When the blade is struck forwardly after the fashion suggested in Figures 2 and 3, the binding engagement between the blade and the carrier and the wedge is immediately broken and this, of course, permits the blades to be advanced to a new position or to be removed.

It is important to observe that forward adjustment of the blade and the subsequent locking of the same in place is affected without a co-extensive rearward movement of the wedge with the result that the wedge remains in firm pressure contact with a substantial portion of the blade in the successively advanced positions of the blade, thereby holding the blade in firm and uniform pressure contact with the back wall of the slot.

To be able to loosen the blade without driving on the small end of the wedge is a substantial and material advantage. That is true because, in those cutters where it is necessary to loosen the blade by first driving on the wedge from the small end of the wedge, it is of course, required that there be provided in the carrier 10 or its equivalent, drilled holes or other means by which there may be gained access to the wedge. In my construction, this is unnecessary and furthermore the rear end of the blade provides a convenient striking area for engagement by a hammer or other convenient striking tool. The same applies to the convenience in striking the forward end of the blade. This greatly facilitates the release and the subsequent adjustment of the blade.

A further convenience looking to the expedious adjustment of the blade resides in the provision of an ever-present scale on the periphery of the body 10 and in explaining this, attention is invited to Figures 1 and 2 in which it is illustrated that the body 10 is provided with a plurality of spaced parallel circumferentially extending lines 40 at right angles to the longitudinal axis of the carrier 10 and intersecting the slots 12 so as to cooperate with the rear ends of the blades or with suitably marked portions of the blades to indicate the positions of the blades one, with respect to the other, to the end that the operator may adjust all the blades co-extensively without the aid of extraneous measuring devices.

As shown in Figures 1, 2, 7 and 8, the grooves 18 break out through the periphery of the carrier, first, to allow the wedges 20 to engage the blades close to the cutting portions thereof and, second, to allow the wedges to close the otherwise present gaps between the blades and the leading side walls of the slots and in which gaps cuttings and cast iron dust are prone to accumulate. More specifically, by having the wedge receiving grooves break through the periphery of the carrier, there is assured very tight metal to metal contact between the wedges and the leading sides of the blades and between the wedges and the leading sides of the slots. This obviates the possibility of slight gaps between the blades and the walls of the slots as is the case where the wedges are not located at the periphery or substantially flush therewith. It is not possible in ordinary shop practice, when operating on a production basis, to produce blade slots with sufficient accuracy to avoid a few thousandths looseness. The gaps produced by this looseness between the front sides of the blades and the leading sides of the slots collects fine chips and cast iron dust. This, of course, is undesirable. Furthermore, it is highly advantageous to have the wedges grip the blades as close to the peripheral cutting portions thereof as possible for greater rigidity. The dual advantage resulting from what might be said to be the peripheral mounting of the binding wedge has been found to be highly important and is believed by me to be new in the art.

By reference to Figures 1, 2 and 8 it will be seen that the leading side wall of each slot 12 is relieved at the forward end thereof as indicated at 35 and that the forward end of each wedge is similarly relieved to provide clearance for chips. Of course, as a result of numerous successive adjustments of the blades, the wedges will occupy positions somewhat rearward of those suggested in Figures 1 and 2.

For example, by reference to Figure 4 it will be seen that after numerous successive adjustments of the blades the wedges will occupy positions almost wholly within the grooves 18 so that the clearance spaces in the forward portions of the wedges must cooperate with the clearance spaces 35 in providing maximum clearance for chips.

The wedging arrangement disclosed in Figures 1 to 8 looks to far more than the mere additive wedging effect of combined longitudinal and radial blade tapers. To be sure, this is a consideration but, in addition and as brought out in the opening paragraphs of this specification and elsewhere, such wedging arrangement looks to economical manufacture because the compound wedging action is achieved with the use of easily produced radially and longitudinally parallel blade slots, in contrast to more expensively performed operations necessary for the cutting of blade slots with tapers to match the blades.

I believe that I am the first in this art to provide an inserted blade cutter in which the side walls of the blade receiving slots are longitudinally and radially parallel while the blades mounted in the slots are longitudinally and radially tapered.

In the form of invention illustrated in Figures 9 and 10 the body of the carrier is designated by the numeral 50 and is provided with a plurality of spaced slots 52 having parallel side walls produced by a simple milling operation as distinguished from the more expensively formed dovetailed slots.

The blades 54 positioned within the slots 52 are shown to have longitudinally parallel side walls while such side walls converge radially with the trailing sides of the blades firmly engaged with the back side walls of the slots while the leading side walls of the blades are engaged by the wedges 56 corresponding in general to the wedges 20.

It is clearly illustrated in Figure 9 that the bottom walls of the slots are inclined outward away from the longitudinal axis of the carrier in the direction of the forward end thereof so that forward adjustment of the blades will provide properly proportioned longitudinal and radial movement to compensate for wear.

It is further shown in Figure 9 that the rear ends of the blades are engaged by thrust members 56 which take the thrust of the cut, as in the case of other cutters of this general type and a lock nut 58 may be threaded onto the carrier 50 and has pressure engagement with the thrust member 56 to hold the same securely in place. It is believed to be apparent from an inspection of Figure 9 that the blades 54 may be adjusted and released with the same ease as described in connection with the blades 14.

The foregoing illustrates that the invention forming the subject of this application is capable of a variety of mechanical expressions and it is therefore to be understood that the several forms of invention herewith shown and described are to be taken merely as preferred examples of the same and that such minor changes and arrangement of parts may be made as will remain within the spirit of the invention and the scope of what is claimed.

Having thus described the invention what is claimed is:

In an inserted blade cutter, a body having a slot provided with parallel side walls; a work engaging blade in said slot and having a cutting end portion, said blade being formed with a uniform radial taper continued to the outer edge portion thereof, thus leaving unbroken the cutting end portion of the blade; and a longitudinally tapered wedge extending lengthwise of said blade in pressure engagement therewith, there being a groove for the reception of said wedge and extending substantially lengthwise of the blade; said wedge, said groove and said blade being diminished in cross sectional area substantially lengthwise of the blade and in the same direction.

FRANK P. MILLER.